United States Patent
AbouJaoude et al.

(10) Patent No.: US 6,747,835 B2
(45) Date of Patent: Jun. 8, 2004

(54) METHOD AND APPARATUS FOR SIMULTANEOUSLY MEASURING AND CALCULATING SERVO-RELATED DATA

(75) Inventors: Fadi Youssef AbouJaoude, Arvada, CO (US); Robert James Rodelli, Superior, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 489 days.

(21) Appl. No.: 09/745,761

(22) Filed: Dec. 20, 2000

(65) Prior Publication Data

US 2001/0048570 A1 Dec. 6, 2001

Related U.S. Application Data

(60) Provisional application No. 60/198,999, filed on Apr. 21, 2000.

(51) Int. Cl.$^7$ ............................................. G11B 5/596
(52) U.S. Cl. ........................ 360/77.04; 360/77.07
(58) Field of Search ....................... 360/77.04, 77.07, 360/75, 76, 77.01, 77.02

(56) References Cited

U.S. PATENT DOCUMENTS

| | | | |
|---|---|---|---|
| 4,872,074 A | 10/1989 | Brown et al. | 360/77.07 |
| 4,896,228 A | 1/1990 | Amakasu et al. | 360/77.08 |
| 4,969,059 A | 11/1990 | Volz et al. | 360/78.04 |
| 4,982,295 A | 1/1991 | Yakuwa et al. | 360/77.04 |
| 5,050,016 A | 9/1991 | Squires | 360/77.08 |
| 5,210,726 A | 5/1993 | Jackson et al. | 369/32 |
| 5,367,414 A | 11/1994 | Kelly et al. | 360/77.12 |
| 5,581,420 A | 12/1996 | Chainer et al. | 360/75 |
| 5,585,976 A * | 12/1996 | Pham | 360/77.04 |
| 5,760,990 A | 6/1998 | Ukani et al. | 360/77.04 |
| 5,773,948 A | 6/1998 | Kim et al. | 318/561 |
| 5,774,297 A | 6/1998 | Hampshire et al. | 360/77.04 |
| 5,793,559 A | 8/1998 | Shepherd et al. | 360/78.09 |
| 5,875,064 A | 2/1999 | Chainer et al. | 360/75 |
| 6,061,200 A * | 5/2000 | Shepherd et al. | 360/77.04 |
| 6,141,175 A * | 10/2000 | Nazarian et al. | 360/77.04 |
| 6,563,663 B1 * | 5/2003 | Bi et al. | 360/77.04 |

* cited by examiner

*Primary Examiner*—David Hudspeth
*Assistant Examiner*—Jason Olson
(74) *Attorney, Agent, or Firm*—David K. Lucente; Derek J. Berger

(57) ABSTRACT

A method and apparatus for simultaneously measuring and calculating servo-related data is disclosed. The method involves measuring the servo related data for a first track of a disc drive and then measuring servo related data for a second track. The method further involves calculating servo related values for the first track, based on the measured servo related data for the first track, while servo related data is being measured for the second track. This method is applicable for processes such as zero acceleration path determination in disc drives, whereby position errors are measured for the first track and then position errors are measured for a second track while simultaneously calculating the zero acceleration path for the first track based on the position errors previously measured.

17 Claims, 3 Drawing Sheets

METHOD AND APPARATUS FOR SIMULTANEOUSLY MEASURING AND CALCULATING SERVO-RELATED DATA

RELATED APPLICATIONS

This application claims priority of U.S. provisional application Serial No. 60/198,999 filed on Apr. 21, 2000.

FIELD OF THE INVENTION

This application relates generally to servo control systems and more particularly to a method and apparatus that measures servo data for one track while calculating values for another track.

BACKGROUND OF THE INVENTION

Disc drives have magnetic discs that are rotated while read and write heads communicate magnetic signals to and from the rotating disc. The magnetic signals are generally written in tracks that often form generally concentric circles about the magnetic disc. The tracks periodically contain servo related data, such as a track ID that indicates the track that the head is positioned over as well as position data that indicates the radial position of the head relative to other tracks and the centerline of the current track. Servo bursts are written into the magnetic disc during manufacturing and contain the servo related data.

A servo control system positions the head over the desired track and maintains that position during the read or write process for the desired track. The servo control system utilizes the servo related data to maintain the head's position over the desired track by detecting that the head is straying from the centerline and by applying correction to the head's position. However, the servo related data initially written during manufacturing may result in eccentricities, referred to as repeatable run out (RRO), due to various reasons such as spindle motor harmonics. Furthermore, the servo control system's response may introduce additional eccentricity. As a result, the head follows tracks that are not ideally concentric.

The eccentricity of the tracks may create problems because one track may encroach upon another and data stored on the disc could become corrupt due to overwriting. Ideal track centerlines follow concentric paths that prevent such encroachment. Therefore, to establish the concentric path, a zero acceleration path (ZAP) is computed during certification of the disc drive. The ZAP process reads the servo data resulting in eccentricities and computes corrections that are written into the ID field of the track sectors for both the read heads and the write heads. These corrections instruct the servo control system to maintain the head such that generally concentric tracks result.

ZAP reduces the eccentricities but requires a relatively large amount of time to perform per disc drive being certified. Conventionally, ZAP is performed by reading servo data from a track, averaging position errors from an ideal center, and computing corrections based on the position error data. The corrections are then written into the ID fields for the track. This set of serial operations is repeated for each track and for each head.

Accordingly there is a need for a method that decreases the amount of time necessary for performing ZAP.

SUMMARY OF THE INVENTION

Against this backdrop the present invention has been developed. The present invention involves measuring servo data for one track while calculating the correction servo data for a previously measured track and then returning to the previously measured track to write the correction servo data. The time spent calculating for one track and measuring for another is thereby combined into the same time period to reduce the overall length of time require by ZAP.

An exemplary method for simultaneously measuring and calculating servo related data in a disc drive includes the following steps. A first servo related data is measured from a first track. Then, a second servo related data is measured from a second track. While performing the measuring step for the second track, a servo related value is calculated for the first track based on the first servo related data.

An exemplary disc drive configured to perform the exemplary method for simultaneously measuring and calculating servo related data includes the following elements. At least one head having a controllable position is included. The head is configured to perform the measuring steps of the method. A processor is included and is configured to receive servo related data from the head and to perform the calculating step of the method. A servo control is also included and is configured to control the position of the head.

These and various other features as well as advantages which characterize the present invention will be apparent from a reading of the following detailed description and a review of the associated drawings.

DETAILED DESCRIPTION

Figure 1:
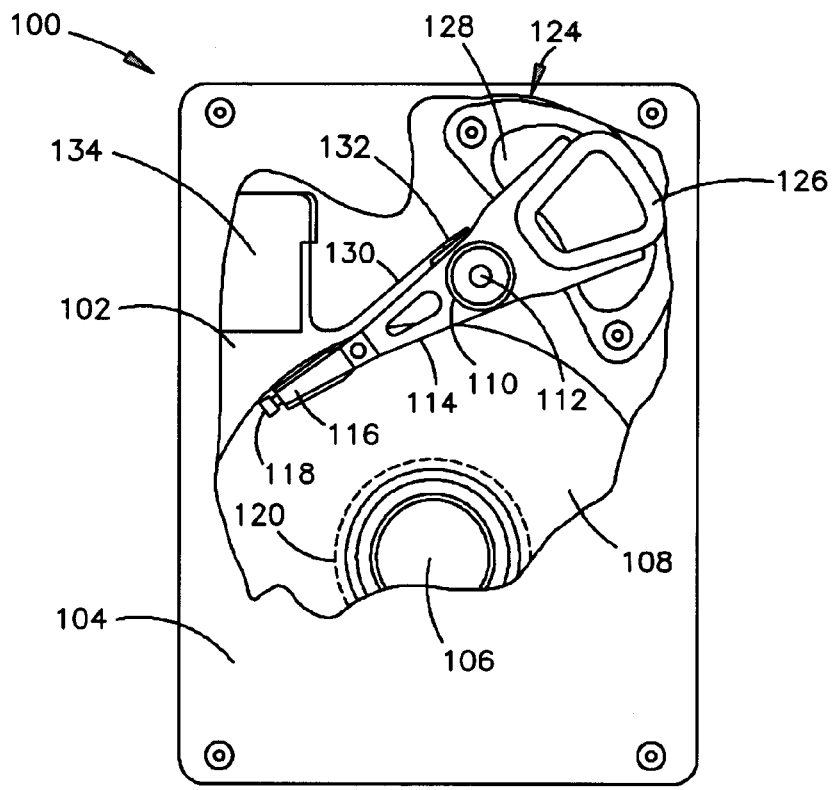
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
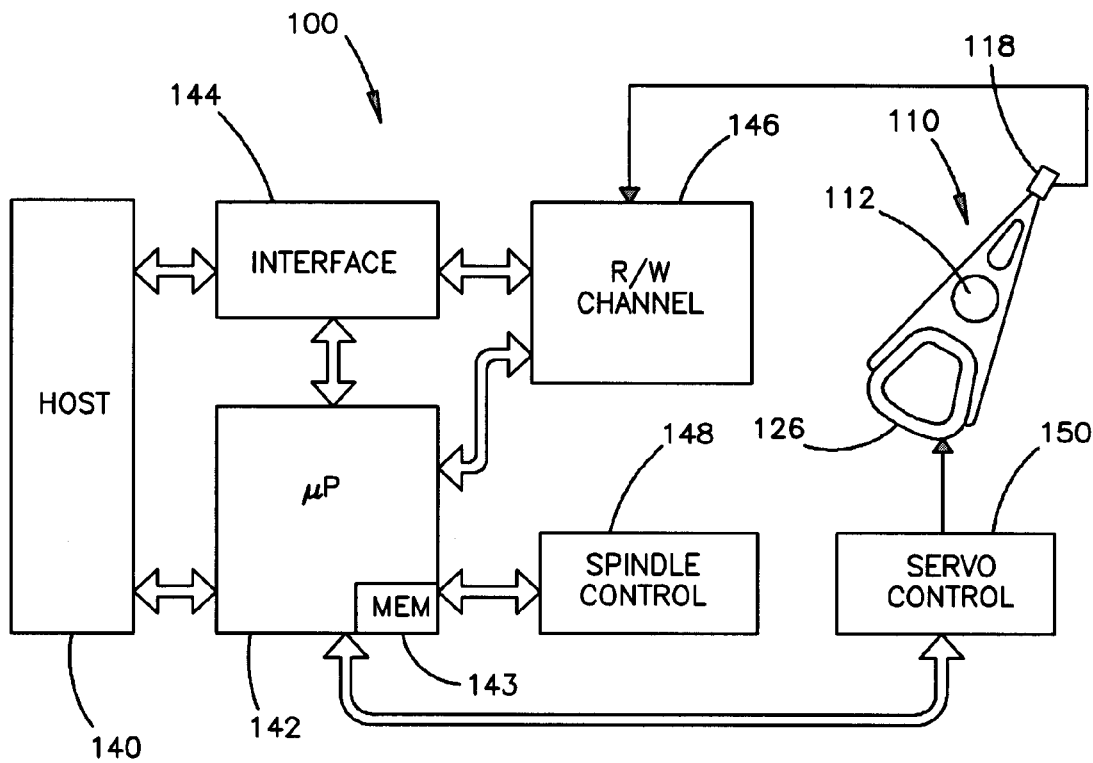
FIG. 2 is a diagram of the disc drive electronics and actuator arm.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
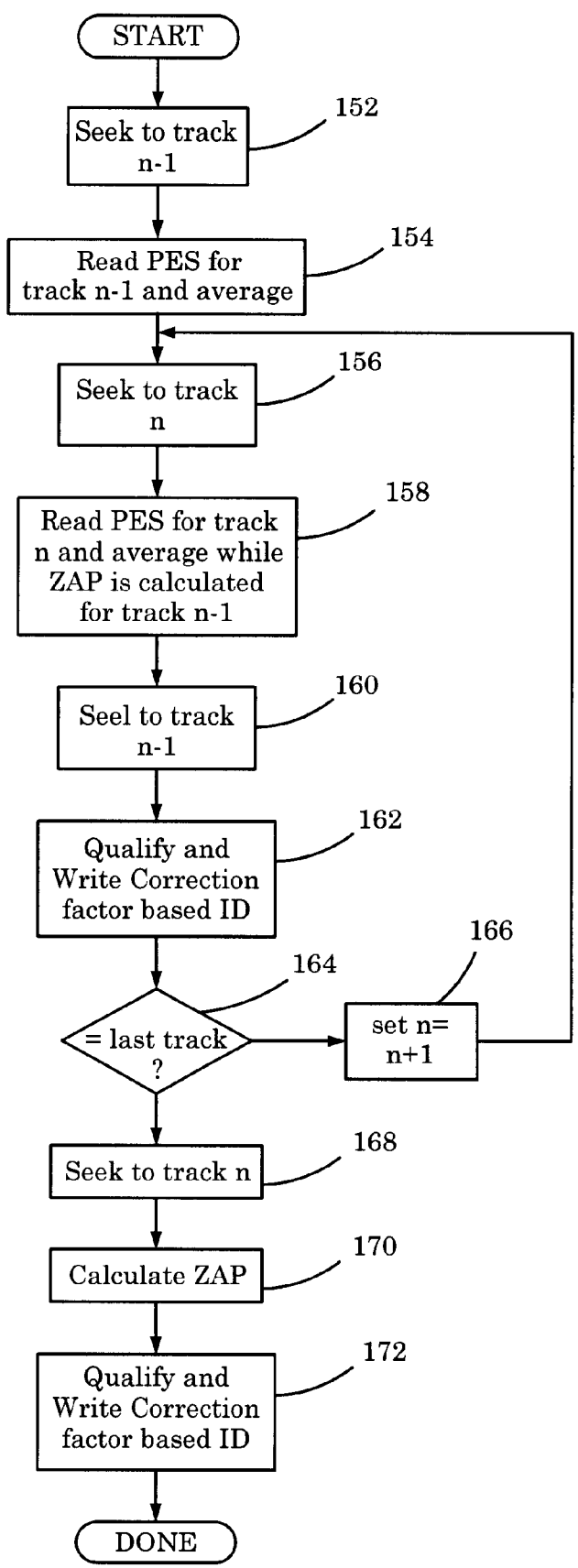
FIG. 3 is a flow chart of the ZAP subroutine in accordance with a preferred embodiment of the present invention.

FIG. 3 illustrates the operational flow of one embodiment of the present invention. The ZAP process begins by seeking the head to the first track (n−1) to be analyzed at Seek operation 152. After arriving at track n−1, the position error signal (PES) is read by the head reading its position and providing it to the microprocessor. The PES value for each burst is averaged from measurements taken over several revolutions. After the PES values have been stored, typically in a table in memory, Seek operation 156 positions the head over the next track (n).

After arriving at track n, the PES is read and the PES value for each burst is averaged from measurements taken over several revolutions at Combination operation 158. However, because the PES values are already known for track n−1, the ZAP calculations for track n−1 can be performed at Combination operation 158 during the PES revolutions for track n. After the PES revolutions and the ZAP calculations have completed, Seek operation 160 returns the head to track n−1.

After arriving back at track n−1, the correction factors determined by the ZAP calculations are validated at Track operation 162 by applying the correction factors from memory to determine if the correction factors appropriately correct for the RRO written into the bursts. If the RRO is sufficiently reduced, then the correction factors are adequate and position ID servo data based on the correction factors are written into the track ID fields by Track operation 172 to enable the servo control system to guide the head along a relatively concentric track.

After the position ID servo data is written into the ID fields, Query operation 164 detects whether track n is the last track to be processed. If so, then Seek operation 168 seeks the head back to track n. ZAP operation 170 then calculates the correction factors for track n based on the PES data stored in memory for track n. Once the correction factors have been computed, Track operation 172 again validates the correction factors by attempting a track-follow while applying them from memory. If RRO is adequately reduced, position ID servo data based on the correction factors is written into the ID fields by Track operation 172. The ZAP process then terminates.

If Query operation 164 detects that track n is not the last track to be processed, then Counter operation 166 increments n to equal n+1. Control then returns to Seek operation 156 where the process continues based on the new value for n. The effect of this process is that the head moves two tracks forward from the track that received its ID field corrections to measure new PES values while the processor calculates ZAP values for one track back from PES measurements previously taken for that track. Then the head moves one track back to write in the corrections previously calculated. This pipelined process continues until the tracks are completed.

Several alternatives exist for the ZAP process. One exemplary alternative is to utilize the Combination operation 158 for several tracks to compute ZAP correction factors for them and then return to the tracks to write in the position ID servo data based on the correction factors one track after the next without interruption. This method requires more storage because the ZAP values may be stored for more than one track at any given time.

Figure 4:
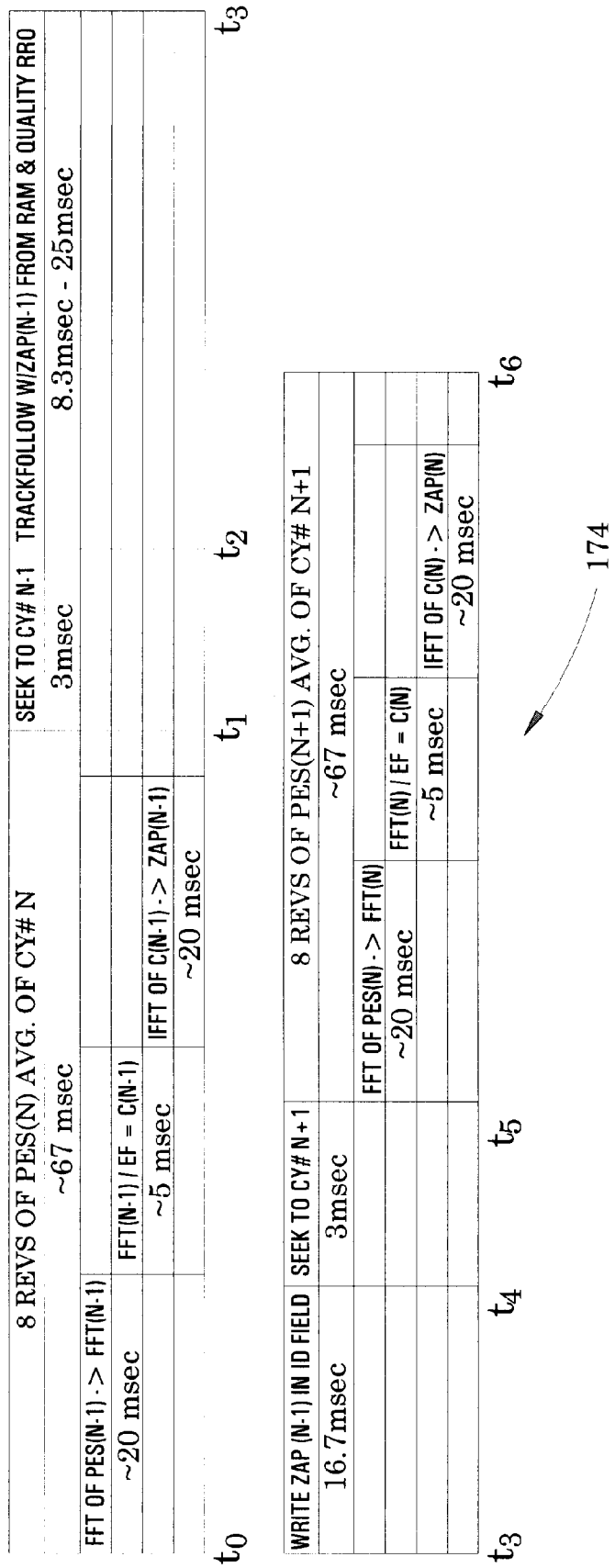
FIG. 4 is a time lapse chart of the ZAP subroutine in accordance with a preferred embodiment of the present invention.

FIG. 4 shows a time lapse chart 174 of one embodiment of the present invention that illustrates overlapping the time necessary for measuring one track and the time necessary for calculating correction values for another track into the same time period to shorten the ZAP process. As shown, the PES measurements for track n begin at $t_0$ and continue until $t_1$. In this example, eight revolutions are used which requires approximately 67 milliseconds for a typical disc drive. The values shown in FIG. 4 are only representative, and other revolution amounts and times are possible as well.

The PES values for track n−1 have been previously measured, and therefore, the calculations for track n−1 may also begin at $t_0$ and continue during the PES measurements for track n. The exemplary ZAP process shown illustrates that a Fast Fourier Transform (FFT) of the PES values for n−1 is computed and requires approximately 20 milliseconds for a typical track. After the FFT is computed, the FFT values are divided by an error function (EF) to compute convolution values C for track n−1, requiring approximately another 5 milliseconds. An Inverse Fast Fourier Transform (IFFT) is then performed on the convolution values over approximately another 20 milliseconds to produce the ZAP values. Generally, the ZAP calculations complete before $t_1$.

After the PES measurements and ZAP calculations have completed at $t_1$, the servo control system seeks the head back to track n−1 which requires approximately 3 milliseconds and completes at $t_2$. Once the head has arrived at track n−1, a track-follow test commences by employing from memory (i.e. random access memory—RAM) the ZAP values previously calculated for track n−1 to qualify the RRO to confirm that the eccentric track following has been reduced. This track-following and qualifying operation typically requires from approximately 8 to 25 milliseconds and extends from $t_2$ until $t_3$. Once confirmed, the ZAP values for track n−1 are written into the track ID fields in track n−1, which requires approximately 17 milliseconds and extends from $t_3$ to $t_4$.

At $t_4$ the servo control system seeks the head two tracks forward to track n+1, which requires another 3 milliseconds. The head arrives by $t_5$ and the PES measurements for track n+1 begin. Since the PES measurements for track n have already been stored, between $t_0$ and $t_1$, the ZAP calculations including the FFT, FFT/EF, and IFFT commence for track n at $t_5$ as well. By $t_6$ the PES measurements for track n+1 and the ZAP calculations for track n have been completed, and the process continues.

The present invention avoids performing the ZAP calculations serially with the PES measurement by performing them in parallel, instead. Therefore, the time required for ZAP is reduced relative to the serial method by the time necessary for the ZAP calculations since they are performed in the background during the required PES measurement revolutions. Aspects of the present invention may be implemented in software, analog and digital hardware, as well as firmware.

In summary, the present invention may be viewed as a method for simultaneously measuring and calculating servo related data in a disc drive which includes the following steps. A first servo related data is measured from a first track (such as by operation 154). Then, a second servo related data is measured from a second track and while performing the measuring step for the second track, a servo related value is calculated for the first track based on the first servo related data (such as by operation 158).

The measuring step may include measuring position error signal values (such as in operation 154). The calculating step may include computing zero acceleration path values (such as in operation 158). The computing step may include performing an FFT of the position error signal values (such as in operation 158). The method may also include writing the servo related value on the first track (such as in operation 162). The method may further include storing the first servo related data in memory (such as in operation 154) and retrieving the first servo related data from memory to performing the calculating step (such as in operation 158). The measuring step may include measuring the first servo related data for a predetermined number of disc revolutions (such as in operation 154). The method may further include averaging the first servo related data over the predetermined number of disc revolutions (such as in operation 154).

The present invention may also be viewed as a disc drive configured to perform the method for simultaneously measuring and calculating servo related data which includes the following elements. At least one head (such as head 118) having a controllable position is included. The head (such as head 118) configured to perform the measuring steps of the method. A processor (such as processor 142) is included and is configured to receive servo related data from the head (such as head 118) and to perform the calculating step of the method. A servo control (such as servo control 150) is also included and is configured to control the position of the head (such as head 118).

The head (such as head 118) may be configured to measure position error signal values. The processor (such as processor 142) may be configured to compute zero acceleration path values. The processor (such as processor 142) may also be configured to perform an FFT on the position error values. The head (such as head 118) may be configured to write the servo related value on the first track. The disc drive may also include memory (such as memory 143 or buffer memory of interface 144) configured to store the first servo related data and provide the first servo related data to the processor. The head (such as head 118) may be configured to measure the first servo related data for a predetermined number of disc revolutions. The processor (such as processor 142) may be configured to average the first servo related data measure over the predetermined number of disc revolutions.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the PES measurements could be taken for several tracks before returning to write the ZAP corrections in the ID field. Additionally, time domain methods may be utilized to compute the ZAP values. Furthermore, the technique of measuring data from one track while simultaneously calculating values for another track may be employed by other disc drive processes in addition to ZAP. The present invention may employ more than one processor and may be implemented in software, firmware, or hardware. Numerous other changes may be made which will readily suggest themselves to those skilled in the art and which are encompassed in the spirit of the invention disclosed and as defined in the appended claims.

What is claimed is:

1. A method comprising steps of:
   a) measuring a first servo related value from a first track;
   b) measuring a second servo related value from a second track; and
   c) while performing measuring step b), calculating a third servo related value for the first track based on the first servo related value.

2. The method of claim 1, wherein the measuring step a) comprises a step a)(1) of measuring position error signal values.

3. The method of claim 2, wherein the calculating step c) comprises a step c)(1) of computing zero acceleration path values.

4. The method of claim 3, wherein the computing step c)(1) comprises a step c)(1)(i) of performing an FFT of the position error signal values.

5. The method of claim 1, further comprising a step d) of writing the third servo related value on the first track.

6. The method of claim 1 wherein the disc drive has memory, the method further comprising steps of:
   e) storing the first servo related value in the memory; and
   f) retrieving the first servo related value from the memory to perform step c).

7. The method of claim 1, wherein measuring step a) comprises a step a)(1) of measuring the first servo related value for a predetermined number of disc revolutions.

8. The method of claim 7, further comprising a step d) of averaging the first servo related value measured over the predetermined number of disc revolutions.

9. An apparatus configured to perform the method of claim 1 comprising:
   at least one transducer having a controllable position, the transducer configured to perform the measuring steps a) and b);
   a processor configured to receive the first servo related value from the transducer and to perform the calculating step c); and
   servo control circuit configured to control the position of the transducer.

10. The disc drive of claim 9, wherein the transducer is configured to measure a series of several position error signal values.

11. The disc drive of claim 10, wherein the processor is configured to compute a series of several zero acceleration path values.

12. The disc drive of claim 10, wherein the processor is configured to perform an FFT on the position error values.

13. The disc drive of claim 11, wherein the transducer is configured to write the third servo related value on the first track.

14. The disc drive of claim 9, further comprising memory configured to store the first servo related value and provide the first servo related value to the processor.

15. The disc drive of claim 9, wherein the transducer is configured to measure the first servo related value for a predetermined number of disc revolutions.

16. The disc drive of claim 9, wherein the processor is configured to average the first servo related value measured over the predetermined number of disc revolutions.

17. A control system comprising:
   at least one transducer; and
   means for simultaneously calculating a servo related value for a first track and measuring a servo related value set with the transducer for a second track.

* * * * *